Nov. 12, 1968   E. A. LONGENECKER   3,410,580
HITCH LOCK
Filed Sept. 20, 1966   3 Sheets-Sheet 2
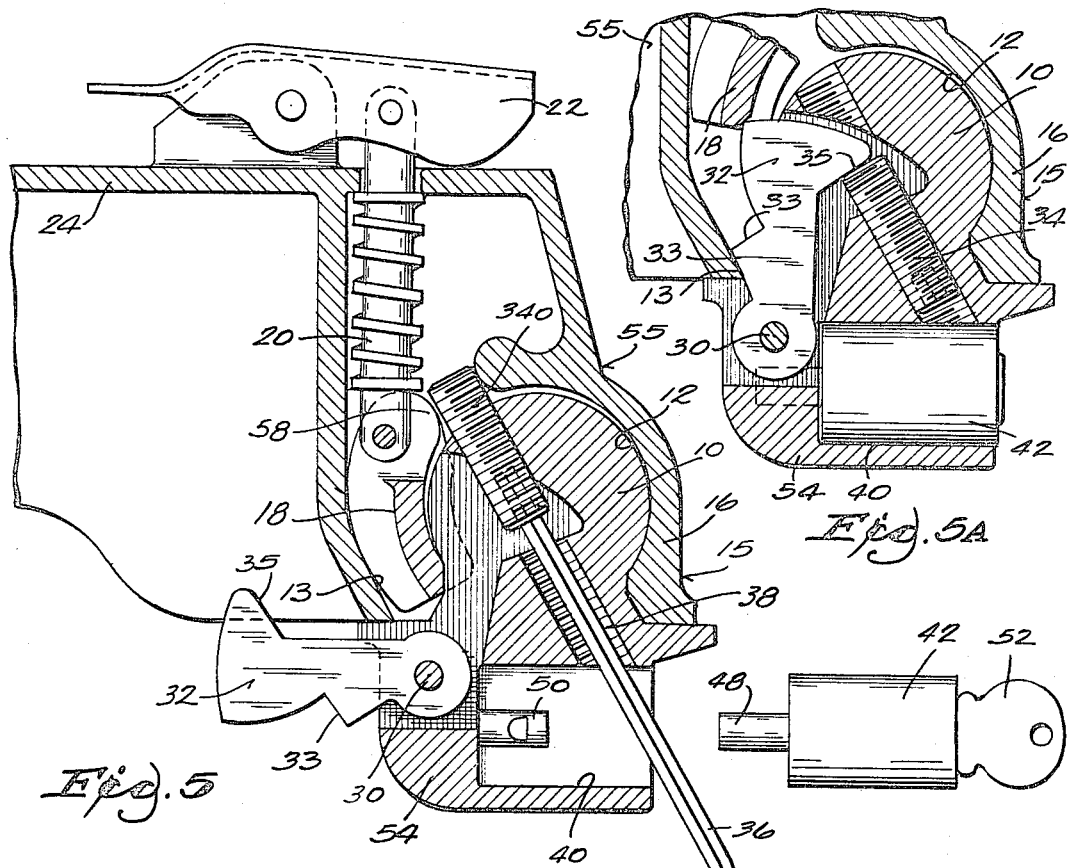
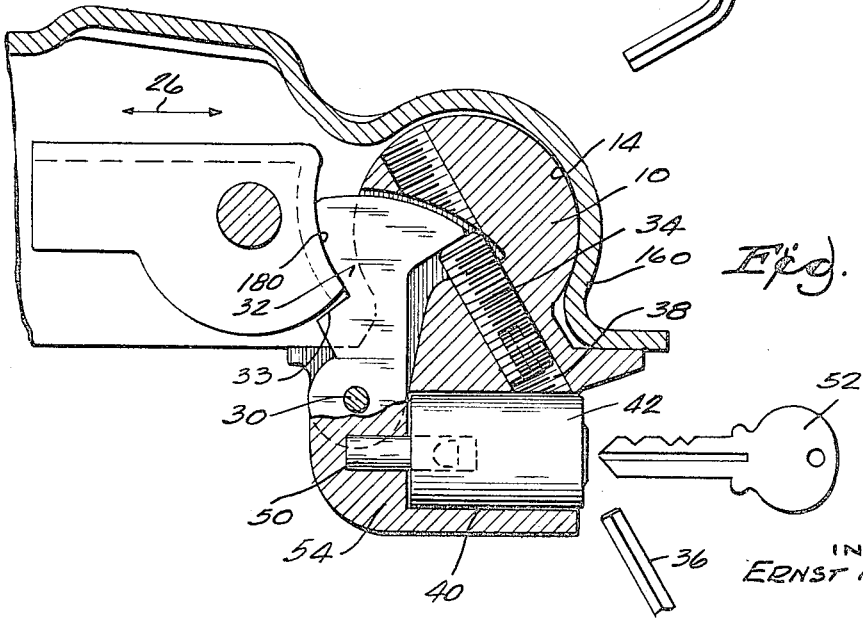
INVENTOR
ERNST A. LONGENECKER
Wheeler, Wheeler, House & Clemency
ATTORNEYS Nov. 12, 1968  E. A. LONGENECKER  3,410,580
HITCH LOCK
Filed Sept. 20, 1966  3 Sheets-Sheet 3
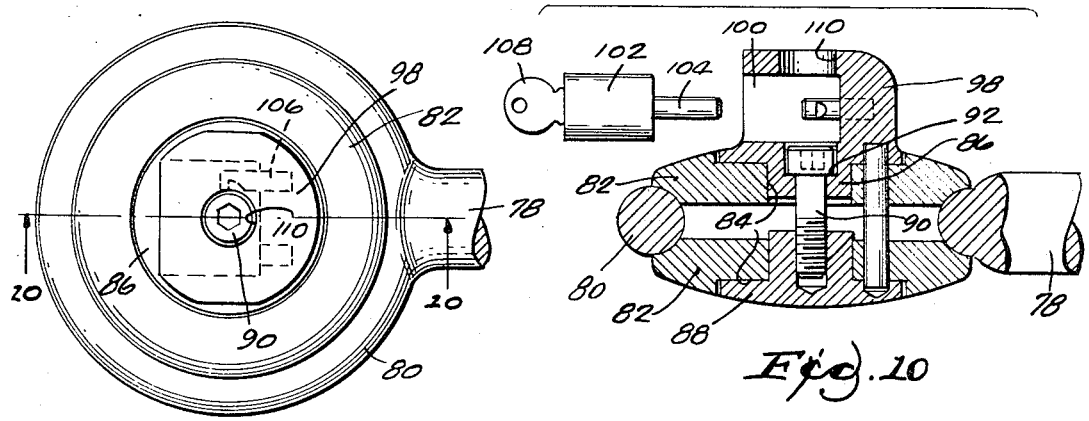
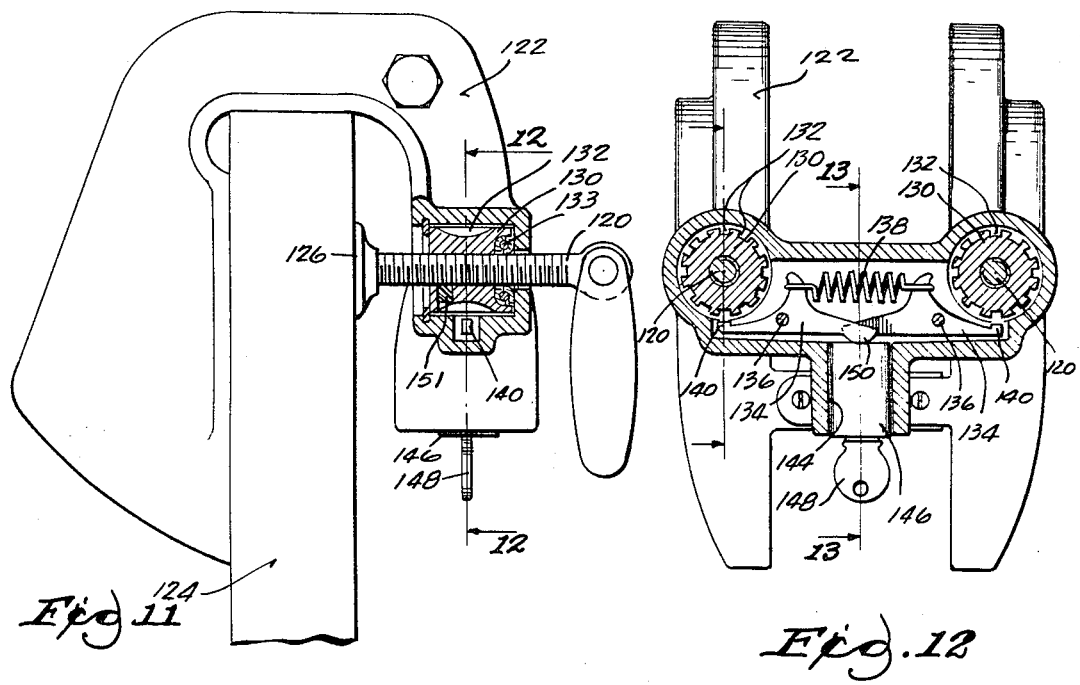
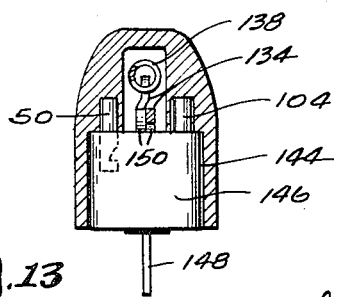
INVENTOR
ERNST A. LONGENECKER
Wheeler, Wheeler, House & Clemency
ATTORNEYS United States Patent Office 3,410,580
Patented Nov. 12, 1968

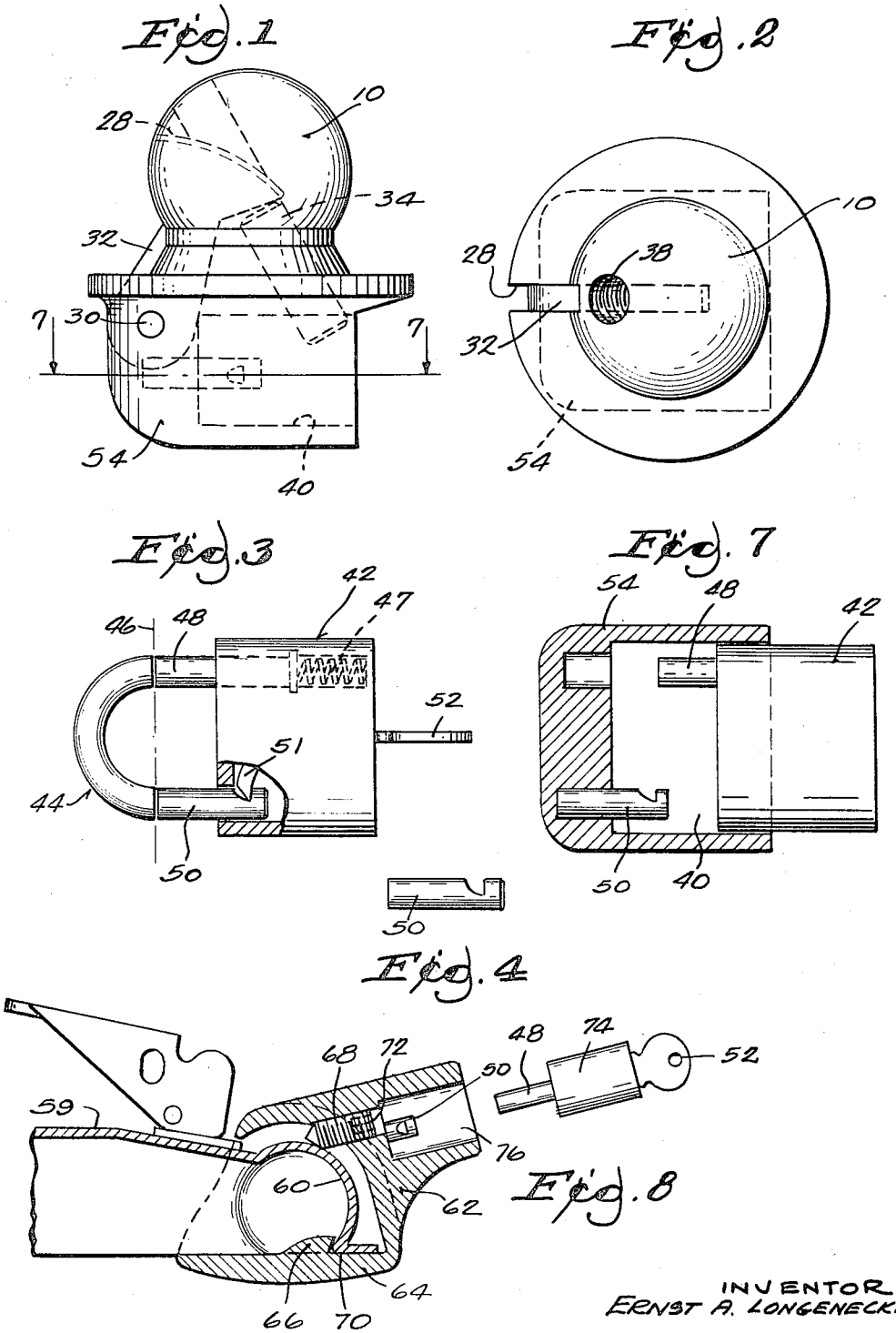

3,410,580
HITCH LOCK
Ernst A. Longenecker, 17820 Robinwood St.,
Brookfield, Wis. 53005
Filed Sept. 20, 1966, Ser. No. 580,444
19 Claims. (Cl. 280—507)

ABSTRACT OF THE DISCLOSURE

Generically, it is contemplated that a part manipulated to release one member from another shall be accessible only in a recess in which a lock body is housed and in which it can be locked. In other words, the entire lock body is rendered substantially inaccessible by housing it in the said recess where only the key slot is exposed. In most embodiments, the lock body is removed in its entirety to give access to the member that secures the parts in connection. However, in one embodiment, the lock body is not completely withdrawn from the recess, but is only partially withdrawn, and the movement of the lock body itself to and from its fully housed position manipulates the mechanism.

Another generic concept involves an arrangement whereby a screw of some sort re'easably secures the detachable parts in connection and is accessible for manipulation only by removal of the lock body from the recess.

---

Several species of the invention relate to means of preventing theft of an unconnected trailer. Broadly, it is an objective of this invention to preclude the entrance of a towing vehicle ball into the hitch socket either by filling the socket with a lock ball or by covering the end of the hitch fitting and the entrance to the socket with an appropriate cover locked thereto.

In embodiments of the first type, a substitute locking ball receivable into the socket of a conventional trailer hitch as a substitute for the ball of the authorized towing vehicle has screw-controlled means for varying relative dimensions of the socket and the substitute ball whereby to prevent or permit egress of the ball. When the ball is in place, it prevents exposure of the socket to receipt of the ball of an unauthorized towing vehicle. A substitute ball and means for forcing and locking it into the fixed-walled recess of a conventional trailer hitch socket is a generic concept believed to be new as such, regardless of the specific locking means employed.

Since the socketed fitting of a conventional trailer hitch is usually externally convex, having the general shape of a ball, the cover which closes its ball-receiving opening may be socketed to receive the fitting to close its ball-receiving opening. The cover has a shoulder which enters the opening sufficiently so that it can be released only by bodily displacement, such displacement being prevented by a screw which is so disposed that it can be rendered inaccessible in a recess enclosed by a lock body having little or nothing exposed except the key slot.

A rugged means adjustable to and from a position for holding the parts displaced and rendered inaccessible by a lock body as above described is believed to be generically new. In each of the several trailer hitch embodiments herein disclosed, a set screw displaces the inter-engaged parts to render them inseparable until the set screw is released, the set screw being rendered inaccessible by a lock body which is socketed in the device and has no parts exposed which could be damaged or broken to gain access to the socket without also destroying the socket itself and hence thwarting the planned theft.

One embodiment somewhat different from the others involves a clamping screw which may be used upon any desired apparatus, an outboard motor being an example. Instead of preventing the screw from rotating, the instant embodiment permits the screw to be rotated freely and the lock permits or requires the nut to rotate with it so that no clamping occurs unless the nut is restrained against rotation. This can be done only through control mechanism which is normally inaccessible behind a lock body normally fixed at the bottom of a recess, where it displaces the control parts to positions in which they release the nut to permit it freedom of rotation so that the clamp screw cannot be unclamped.

Background of the invention

Padlocks and the like as heretofore used have been particularly vulnerable because their hasps are exposed where they can be cut. In most embodiments of the present invention, the lock does not of itself secure the parts together but it is movably mounted in a recess where it obscures and renders inaccessible the member that actually does the locking.

The invention is by no means limited to the locking of a trailer hitch but it has particular advantage in that field. Many devices have been proposed for preventing theft of trailers but all of them heretofore have been of such a nature that the breakage or deflection of exposed parts would open the socket to permit the insertion of a ball of an unauthorized towing vehicle. It is a common occurrence for an owner of a trailer to have the trailer stolen when he is away with his car. Such theft is precluded by the substitute ball which is locked into the trailer socket according to the present invention.

Description of the invention

FIG. 1 is a view in side elevation showing a device embodying the invention.

FIG. 2 is a plan view of the device shown in FIG. 1.

FIG. 3 is an enlarged detail view of a conventional lock showing how the lock is converted for use in the device of FIG. 1.

FIG. 4 is a plan view of the lock post severed from the lock in FIG. 3 for use in accordance with the present invention.

FIG. 5 is a view in longitudinal vertical section showing the device of the present invention in use in a well-known type of trailer hitch socket, the lock being separately shown in side elevation.

FIG. 5A is a fragmentary view similar to FIG 5 showing the parts interlocked in different relative positions.

FIG 6 is a view like FIG 5 showing another conventional socket with the device of the present invention in use therein, the lock being in place in the recess provided for it.

FIG. 7 is a view in section on the line 7–7 of FIG. 1, with the lock partially inserted in the recess provided for it.

FIG. 8 shows in longitudinal section the device of the present invention used to lock a hitch ball rather than a hitch socket by providing a cover which can be secured about the ball portion of the hitch, the lock being illustrated in its separated position.

FIG. 9 is a plan view of an entirely different style of trailer hitch, the tongue being fragmentarily illustrated.

FIG. 10 is a view taken in longitudinal section on the line 10–10 of FIG. 9, the lock being separately illustrated.

FIG. 11 shows a modified embodiment of the invention partially in side elevation and partially broken away to the plane indicated at 11–11 in FIG. 12.

FIG. 12 is a view taken in section on the line 12–12 of FIG. 11.

FIG. 13 is a fragmentary view on the line 13–13 of FIG. 12.

The ball 10 is of conventional dimensions to be received into the trailer hitch sockets shown at 12 in FIG. 5 and at 14 in FIG. 6. The device of FIG. 5 has a relatively fixed jaw 16 and a movable jaw 18 which has a link 20 connecting it with a hand lever 22 on the trailer tongue 24. The jaw 18 is raised and lowered by lever 22 between ball unlocking and locking position. FIG. 5 shows the jaw 18 in locking engagement with the substitute ball 10 provided in accordance with the present invention.

The ball 10 has a slot 28 which is spanned near its lower end by a pintle 30 upon which the dog member 32 is pivotally movable between the full and dotted line positions in which it is illustrated in FIGS. 1 and 5. In FIG. 5, dog 32 is shown in full lines in a retracted position. The dog 32 is not used when the hitch 55 is locked with the jaw in its locked position. However, FIG. 5A shows how the same parts are usable to lock the hitch when the jaw 18 is in its retracted or open position. As shown in FIG. 5A, the dog 32 has been swung upwardly so that its shoulder 33 is engaged with the surface 13 of the socketed female hitch casting 15. The thrust of set screw 34 is now exerted on the margin 35 of dog 32 to force the dog against surface 13 of the casting 15, whereby to make it impossible to withdraw the ball 10 from the socket 12. In this position, no direct contact between the dog 32 and the movable jaw 18 is required. To emphasize this point, clearance is illustrated between these parts (although no clearance is necessary).

In the device shown in FIG. 6, movable jaw 180 is reciprocable horizontally toward and from the fixed jaw 160 by means not shown. The device is conventional and the movement of the jaw 180 forth and back is in the direction indicated by the arrow 26. FIG. 6 shows the hitch jaw 180 in its open or retracted position.

Essentially the same substitute locking ball 10 is used in both the conventional type of hitches shown in FIG. 5 and that shown in FIG. 6. It has an integral base 54 which so closes the socket below the ball as to make the socket inaccessible, thereby precluding introduction of a prying implement.

Threaded within the ball 10 at an oblique angle is a set screw 34 which, in the instant device, is designed to be operated by an Allen wrench 36. The threaded bore 38 in which the set screw operates opens at its lower end into a recess 40 in a base 54 which is preferably integral with the ball. This recess receives a generally conventional lock body 42. As best shown in FIG 3, the lock body was originally provided with a hasp 44. Both legs of the hasp have been sawed off on the broken line 46. One leg is biased outwardly by spring 47 and may be left in the lock as a stud 48. The lock body and the notched bar 50 constituting the other leg are separable when the lock dog 51 is retracted by operation of key 52.

The ball 10 is provided with the aforesaid integral base 54. The notched bar 50 is attached to the base at the rear end of the recess 40 and is so positioned that when the lock body 42 is inserted into recess 40 the notched bar 50 projects into the lock body to be engaged by its keeper 51 in routine fashion. When the lock body is in place in the recess and the key 52 is withdrawn, no part of the lock body is exposed with the exception of the end having the key slot. The recess preferably opens horizontally so that the key slot is readily accessible. A bore may be provided in the base 54 for the stud 48 if this is non-yieldable in the lock body. Normally stud 48 yields by compression of spring 47.

In the case of the type of hitch shown in FIG. 5, the screw 340 projects across part of the upper end portion 58 of the movable jaw 18, thus securing the jaw against retraction to its open position. The ball 10 is thereby securely held within the trailer hitch socket 12 to preclude entry of an unauthorized towing vehicle ball into that socket. Yet the device may be opened with ease by the holder of the proper key 52. By manipulating the lock 42 with the key and withdrawing the lock from the recess 40 and by retracting the screw 340 with wrench 36, the movable jaw becomes released and can be lifted by lever 22 to permit complete withdrawal of the locking ball 10.

Similarly, when the movable jaw 18 is retracted from the position of FIG. 5 to the position of FIG. 5A, the same set screw 340, now operating on dog 32, will hold the ball 10 within socket 12 by forcing it against the immovable side wall portion of the socket. In effect, the ball has been expanded by the action of the set screw upon the dog 32.

In the type of hitch shown in FIG. 6, in which the movable jaw 180 operates horizontally rather than vertically, this jaw is left in its retracted position and the dog 32 carried by the base 54 is swung upwardly about pintle 30 to a position such that it may be engaged by set screw 34 and forced outwardly into engagement with the retracted jaw 180. Both in the device of FIG. 5 and that of FIG. 6, the change in relative dimensions of the ball and socket will preclude withdrawal of the locking ball except by authorized manipulation of the lock. Use of the key 52 is a prerequisite.

In both devices the retraction of the locking device leaves the socket unimpaired and unchanged so that it can be used conventionally in accordance with its intended function. It is to be noted that a screw is used as a locking device in both types of sockets. It is, of course, to be noted that the device need not be designed to be universal. A locking device embodying the invention made solely for the type of trailer hitch shown in FIG. 5 does not require the use of dog member 32. Similarly, if the device is used solely in the type of hitch shown in FIG. 6, the dog 32 could have a much reduced range of movement, since it would not have to swing outwardly to the position in which it is shown in FIG. 5. However, the locking device as illustrated is of universal application to the two types of jaws and hitches shown. These, at the present time, represent the majority of all hitches in common use.

In the device of FIG. 8, the trailer tongue 59 is provided with a hitch having the usual spherically socketed terminal portion 60. In order to secure this particular construction against theft, I provide a cover 62 in which terminal 60 is receivable to be enclosed and locked to prevent entry into the hitch socket of the ball of an unauthorized towing vehicle. The cover 62 has a base portion 64 extending beneath the hollow lower portion of the socket 60. An integral lug 66 engages within the hollow portion 60 so that the parts can be separated only by relative vertical movement. The set screw 68 engages over the trailer tongue to hold the lower margin 70 behind the shoulder provided by lug 66 so that the cover is securely locked to the end of the tongue to prevent any conventional coupling operation until the cover is removed.

As previously, the end 72 of the set screw which is socketed to receive a wrench is completely inaccessible when the lock body 74 is in the recess 76. With the lock body removed as shown in FIG. 6, the end of the set screw is accessible and it may be retracted to permit removal of the cover.

FIGS. 9 and 10 show the application of principles of the invention to another very different type of hitch. The tongue or tow bar 78 ends in a ring or eye 80 which, in use, is dropped over a peg on a towing vehicle. The ring 80 is convexly rounded in each cross section for a certain universality of movement. This type of hitch is commonly used in trailers carrying air compressors, welders, and the like.

So that the eye within ring 80 will not receive the peg of a towing vehicle, I engage a disklike plug 82 in each opposite side of ring 80. Each of these plugs has a shouldered recess 84 into which I place the inserts 86 and 88 and connect these by the shouldered bolt 90. The bolt is threaded into the insert 88 and seats against the shoulder 92 of insert 86. The housing 98 on insert 86 provides recess 100 for the lock body 102, as in prior constructions. The spring-pressed prong 104 remains yieldably attached to the lock body while the notched prong 106 is fixed in the housing 98 at the rear of the recess so that the lock body can be detachably secured to it and is releasable only by the key 108.

When the lock body is removed, the head of shoulder bolt 90 becomes accessible through the opening 110 and recess 100. When the bolt 90 is unscrewed, the disks 82 drop from the eye of the ring 80 at the end of tongue 78, leaving the ring accessible to the peg of a towing vehicle. FIGS. 9 and 10 show the mechanism locked in place but, as viewed, the bolt 90 is still exposed to the port 110. It will be concealed and inaccessible when the lock body is inserted in recess 100 and secured therein.

The construction shown in FIGS. 11, 12, and 13 shows means for using the present invention to secure a clamp screw 120 against unauthorized release. As an example of something which may be held by such a clamp screw, I have fragmentarily illustrated an outboard motor bracket 122 engaged over a boat transom 124 against which the swiveled head 126 of the clamp screw 120 is engaged.

The bracket as shown is designed to receive two of the clamp screws 120.

Rotatable within the bracket at two laterally spaced points are sleeve nuts 130 both provided at peripherally spaced points with axially extending ribs 132. The nuts are mounted to turn freely in the bracket and may even be provided with appropriate anti-friction bearings 133 to facilitate their rotation. Obviously, no clamping or releasing movement of either of the screws 120 will be possible if the nuts are free to rotate.

Within the bracket are levers 134 fulcrumed at 136 and biased by a common connecting spring 138. At their free ends, these levers have dogs 140 engageable under spring bias with the external ribs on the lock sleeves 130. When the dogs are so engaged, the sleeves will be held against rotation. Under this condition, the clamp bolts 120 can be threaded inwardly or outwardly through the respective sleeves.

The bracket provides the usual recess 144 for the lock body 146, exposing only the keyhole for the key 148. In this instance, as best shown in FIG. 13, a set screw engages the spring-pressed prong 104 of the lock body so that the lock body can only move part way out of the recess 144 to the limit of movement of the lock body with respect to prong 104. When the lock body is moved partly out, the spring 138 engages the dog 140 with the sleeve nuts 130 so that the clamp screws function. When the lock body is pushed inwardly, it displaces the pads 150 of levers 134 to disengage the lugs from the sleeve nuts so that the clamp screws are locked against functioning.

To prevent the screws 120 from turning in the nuts 130 when the lock is in place, plastic plugs 151 are located in radial holes in the nuts 130 and bear against the threads of the screws 120. However, when the nuts 130 are fixed against rotation by engagement of the dogs 140 in the ribs 132, the friction of the plugs 151 is overcome and the screws may be advanced or retracted to clamp or remove the bracket 122 from the transom 124.

Many other embodiments of the invention are possible and have been tested. The embodiment illustrated has many advantages over all others which are known to me.

I claim:

1. A trailer hitch socket lock for a trailer hitch including a socket for receiving a ball of a towing vehicle, said lock comprising a substitute ball receivable in said socket, means for varying the relative dimensions of the substitute ball and the socket between ball retaining and ball releasing positions, a member having means for its movable support and having a portion engageable with said dimension-varying means to preclude operation thereof toward ball releasing position, said member having an operating portion, a housing having a cavity into which the said operating portion of said member extends and a lock-controlled body removably positioned in said cavity in normally locked connection therewith and completely closing the cavity against access to the operating portion of said member when said body is in place in the cavity, the said operating portion of said member being accessible when said body is withdrawn from said cavity.

2. A trailer hitch socket lock according to claim 1 in which the said member is a screw, the substitute ball having a base constituting said housing provided with a recess constituting said cavity and in which the said operating portion of the screw is normally accessible, said lock-controlled body including a lock casing detachably fitted to the recess for closing said recess about the operating portion of the screw.

3. A trailer hitch lock according to claim 2 in which the lock casing has a hole and the said base has a notched bar fixed to it and projecting into the recess to register with, and be received into, said lock casing when the lock casing is in the recess.

4. A trailer hitch socket lock according to claim 1 in which the first said means comprises a movable jaw for which the socket provides a complementary fixed jaw.

5. A trailer hitch socket lock according to claim 1 in which said first means comprises a member connected for pivotal movement with respect to the substitute ball for engagement with a jaw with which the socket is provided, said member increasing the effective diameter of the ball to preclude removal thereof from the socket.

6. A trailer hitch socket lock according to claim 1 in which the substitute ball has a base connected therewith to be disposed beneath the trailer hitch socket when the substitute ball is in place therein, said substitute ball and base having a slot, the means for varying relative dimensions comprising a dog member disposed in the slot and having pivotal connection with the base for movement into and out of the slot.

7. A trailer hitch socket lock according to claim 6 in which the first said member comprises a set screw in threaded connection with the substitute ball and for which said dog member provides a seat, said base having a recess in which the end of the set screw is normally accessible for adjustment of the set screw, and a lock having a body portion receivable into the recess and having key-controlled means for securing it to the base within the recess for precluding access to the set screw.

8. A trailer hitch socket lock according to claim 1 in which the trailer hitch socket comprises a movable jaw and a fixed jaw and means for actuating the movable jaw to and from ball retaining position, the said member being a set screw adjustable to and from a position for fixing the movable jaw in its ball-retaining position, the said movable jaw constituting the said dimension varying means.

9. A trailer hitch socket lock according to claim 8 in which said set screw projects through the substitute ball and engages the movable jaw to hold the latter in ball-retaining position.

10. A trailer hitch socket lock according to claim 9 in which a base attached to the substitute ball is normally disposed beneath the socket and provided with a recess in which an operating portion of the set screw is normally accessible, and a lock body having key-releasable detachable connection with said base, said body being disposed in the recess in a position rendering the set screw inaccessible when the body is connected with the base.

11. In a lock organization, the combination with relatively movable first and second parts, said first part having means mounting it for movement between advanced and retracted positions and said second part substantially enclosing said first part and having a cavity in which said first part is accessible upon removal of the lock body hereinafter mentioned, a lock body removably positioned in the cavity and having a controlled lock mechanism and with an exposed actuator, means on the second part with which the lock mechanism is releasably connected and from which it may be released by manipulation of the actuator, the said body substantially filling the cross section of the cavity whereby the presence of the lock body in the cavity of the second part renders the first part inaccessible.

12. A lock organization according to claim 11 in which the said first part comprises a screwthreaded member.

13. A lock organization according to claim 12 in which the said screwthreaded member is rotatable in the second part.

14. A lock organization according to claim 11 in which the first part comprises a portion exposed to manipulation through said recess when the lock body is absent therefrom, said organization further including a member having means detachably interlocking it with said second part and releasable solely by manipulation of the first part.

15. In a lock organization, the combination of a recessed first member, a lock body removably disposed in the recess of the first member and having key-controlled mechanism detachably fixing it in the recess and provided with a key slot to receive a key for the manipulation of said mechanism, said lock organization including a part accessible in the recess only on removal of said lock body and operable only therethrough, said lock body substantially closing said recess when fixed therein, whereby to preclude access to said part until said body is released by said mechanism and removed from said recess.

16. In lock organization according to claim 15, a threaded sleeve rotatable in said member, a clamp screw threaded in the sleeve and threadedly movable through the sleeve only when the sleeve is fixed again rotation respecting the member, said part having means normally engaged with said sleeve for securing the sleeve against rotation and being subject to manipulation through the recess for disengagement of the part from the sleeve to accommodate sleeve rotation respecting said member and thereby to preclude threaded movement of the set screw in the sleeve.

17. A trailer hitch lock comprising the combination with a socketed trailer hitch fitting, of a complementary member adapted to render the socket of said fitting inaccessible to the ball of a towing vehicle, said member including means engageable with and readily removable from said fitting in one relative position and interlocked therewith in another relative position, manually adjustable means movable between a releasing position and a position for holding said member and said fitting in the interlocked relative position, and a lock body detachably connected with said member in a position in which it renders said manually adjustable means inaccessible for manual adjustment when the lock body is connected with said member, said lock body having lock means releasably connecting it with said member.

18. A trailer hitch lock according to claim 17 in which said member has a recess in which said lock body is removably disposed, the said manually adjustable means having in said recess the only portion by which it is manually adjustable and said portion being beyond said body in the recess and rendered inaccessible when the body is disposed in the recess.

19. A trailer hitch lock according to claim 18 in which said member constitutes a cover into which the socketed trailer hitch fitting is receivable, said cover having a portion extending beneath the socket of said fitting to preclude entry of a ball therein, said portion having a shouldered boss disposed in the socket of said fitting and interlockingly engaged therewith, the fitting being disengageable from the boss by relative upward movement only when said manually adjustable means is in said releasing position, the manually adjustable means comprising a screw movable to and from engagement with said fitting and acting thereon to hold the fitting interlockingly engaged with the boss, retraction of the screw permitting disengagement when the lock body is removed from the recess to make the screw accessible.

References Cited

UNITED STATES PATENTS

| | | | |
|---|---|---|---|
| 2,854,256 | 9/1958 | Lamberson | 280—512 |
| 3,139,291 | 6/1964 | Geresy | 280—507 |
| 3,213,653 | 10/1965 | Probasco | 70—166 |
| 3,226,133 | 12/1965 | Geresy | 280—507 |
| 3,276,835 | 10/1966 | Hall | 70—169 |

LEO FRIAGLIA, *Primary Examiner.*

J. SIEGEL, *Assistant Examiner.*